United States Patent [19]

Andrysick

[11] 4,210,433
[45] Jul. 1, 1980

[54] FORMING GLASS ARTICLES BY USING A SPIN PLATE

[75] Inventor: Chester A. Andrysick, Corning, N.Y.

[73] Assignee: Corning Glass Works, Corning, N.Y.

[21] Appl. No.: 961,009

[22] Filed: Nov. 15, 1978

[51] Int. Cl.² .................................................. C03B 19/04
[52] U.S. Cl. .................................................. 65/66; 65/127
[58] Field of Search ................ 65/71, 102, 106, 127, 65/302, 75, 66, 68, 89, 207, 94, 258, 259, 208, 255

[56] References Cited

U.S. PATENT DOCUMENTS

| | | | |
|---|---|---|---|
| 672,717 | 4/1901 | Semple | 65/71 |
| 1,236,937 | 8/1917 | Hough, Jr. | 65/106 |
| 2,001,460 | 5/1935 | Haub | 65/71 X |
| 2,015,219 | 9/1935 | Gray et al. | 65/89 |
| 2,198,705 | 4/1940 | Winder | 65/71 |
| 2,333,076 | 10/1943 | Stewart | 65/106 X |
| 2,572,511 | 10/1951 | Palmqvist | 65/71 |
| 2,861,394 | 11/1958 | Ruff | 65/71 |
| 3,130,030 | 4/1964 | Watson et al. | 65/102 X |
| 3,351,449 | 11/1967 | Ambrogi | 65/122 |
| 3,436,202 | 4/1969 | Andrysick | 65/164 |
| 3,818,974 | 6/1974 | Eberle | 65/302 X |

FOREIGN PATENT DOCUMENTS

| | | | |
|---|---|---|---|
| 2088 | 9/1900 | Austria | 65/66 |
| 553317 | 4/1956 | Italy | 65/302 |

Primary Examiner—Richard V. Fisher
Attorney, Agent, or Firm—John P. DeLuca; Burton R. Turner

[57] ABSTRACT

A spin plate, rotatable about a central vertical axis, is positioned axially below the discharge orifice of a glass feeder to initially receive a charge of glass thereon, and the spin plate is rotated about said central axis to spin out said charge into a disc-shaped parison and the spin plate is indexed downwardly so as to receive a forming mold thereabove. The spun parison is particularly adapted to forming articles from low viscosity glasses utilizing techniques heretofore not readily available to such glasses including spinning, vacuum forming, blowing, pressing and blanking.

4 Claims, 6 Drawing Figures

FORMING GLASS ARTICLES BY USING A SPIN PLATE

BACKGROUND OF THE INVENTION

The invention relates to the art of forming glass articles from molten glass, and more particularly to the initial preforming of a patty of molten glass into a disc shaped parison which may be subsequently formed into a finished article by vacuum forming, blowing, pressing, blanking and other known forming techniques.

In the past, with the exception of vacuum forming wherein rolled or sheet glass is normally utilized, the remaining operations generally begin with the depositing of a gob of molten glass within a mold which may then be pressed and/or blown or blanked into a finished article. The viscosity of a gob for a medium size pressing may be in the vicinity of about 10,000 poises, and accordingly relatively high pressing forces are required in order to press-form the gob between a mold and plunger into a formed article. Thus, relatively low viscosity glasses, which may be delivered with a viscosity of below 1000 poises, are not easily adaptable for use with such aforementioned conventional glass forming processes.

U.S. Pat. No. 3,436,202 discloses a pressing apparatus which is adapted to accommodate low viscosity glasses which may be fed by forced stream feeding such as shown in U.S. Pat. No. 3,351,449. The feeding patent discloses the formation of a circular patty within a mold whereas the forming patent sets forth an apparatus for pressing such circular patty prior to the same being indexed horizontally in order to avoid distortion of the patty which would be occasioned upon the implementation of horizontal or transverse motion to the low viscosity molten patty.

The present invention, however, discloses method and apparatus for acting upon and distributing the patty deposited by such feeder patent so as to provide a preformed disc-shaped parison of low viscosity glass which may then be easily formed into various articles utilizing such known techniques as pressing, blowing and vacuum forming.

It thus has been an object of the present invention to improve upon the known technology of delivering low viscosity glasses so as to be able to utilize such glasses in a variety of forming techniques.

SUMMARY OF THE INVENTION

In its very simplest form, the present invention relates to a method and apparatus for forming a disc-shaped parison from a molten charge of low viscosity glass. The low viscosity glass is loaded upon the center line of a spinning plate which forms the glass into a disc-shaped parison. Basically, the low viscosity glass is spun into the disc-shaped parison and allowed to cool to the degree necessary to accomodate a desired forming operation.

BRIEF DESCRIPTION OF THE DRAWINGS

FIG. 1 illustrates the step of charging molten glass to a spinning plate and shearing the stream.

FIG. 2 illustrates the step of indexing the spinning plate downwardly while the glass is spun to a final diameter and the horizontal movement of a mold in position above the spin plate.

FIG. 3 illustrates the movement of the spin plate upwardly into engagement with the mold and the application of pressure and/or vacuum to form the desired shape.

FIG. 4 illustrates the downward movement of the spin plate, the transverse movement of the mold with the finished glass shape, and the removal of the finished shape such as by the application of pressure.

DESCRIPTION OF THE PREFERRED EMBODIMENTS

Figure 1:
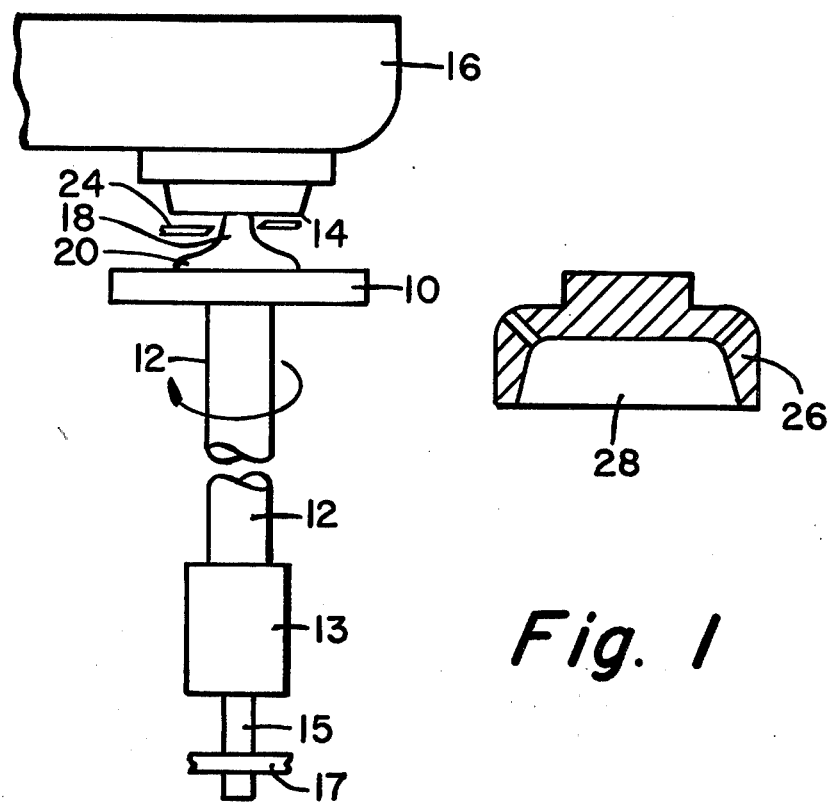
FIGS. 1-4 schematically set forth, in vertical elevation, one embodiment of forming glass utilizing the present invention.
Figure 2:
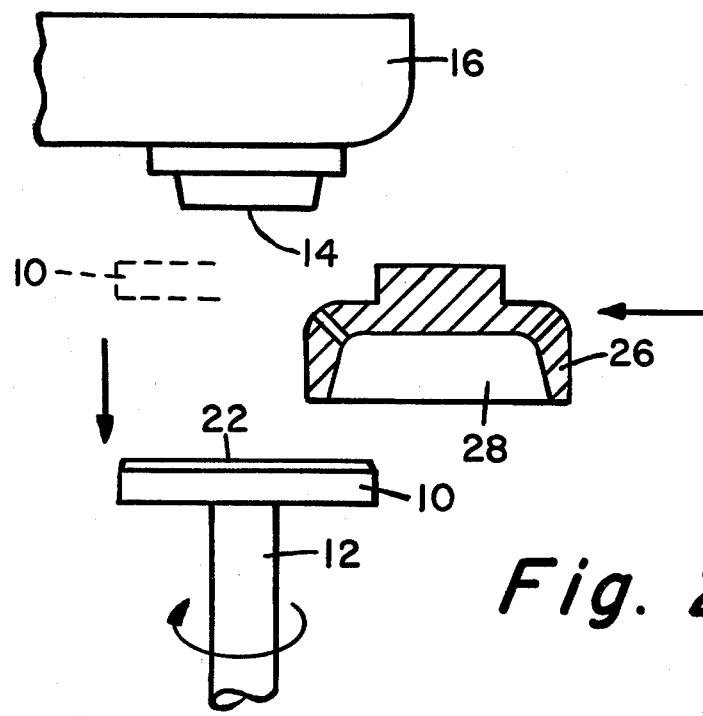

Referring now to FIGS. 1-4, a spin plate 10 mounted on a reciprocal and rotatable shaft 12 is shown positioned below the orifice 14 of a suitable feeder 16, such that the centerlines of the spin plate, shaft and orifice are coaxial. A stream of molten glass 18 is delivered to the flat upper surface of spin plate 10 centrally thereof and initially forms a patty 20 which is spun out into a desired disc shaped parison 22. A pair of shear blades 24 cut the stream 18 at the end of each charge of glass, and flow is interrupted at the orifice 14 until a subsequent charge is desired.

Figure 3:
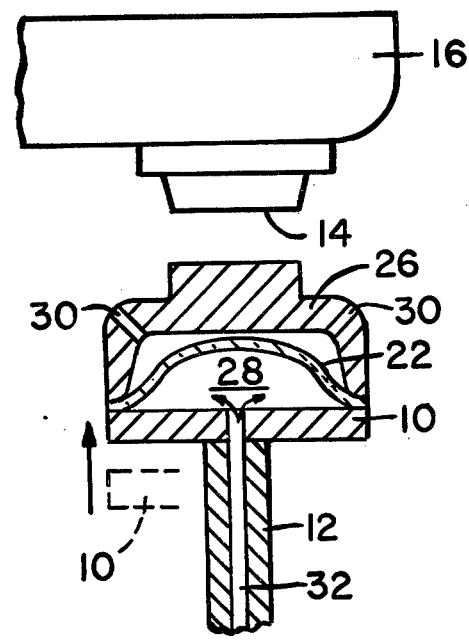
Figure 4:
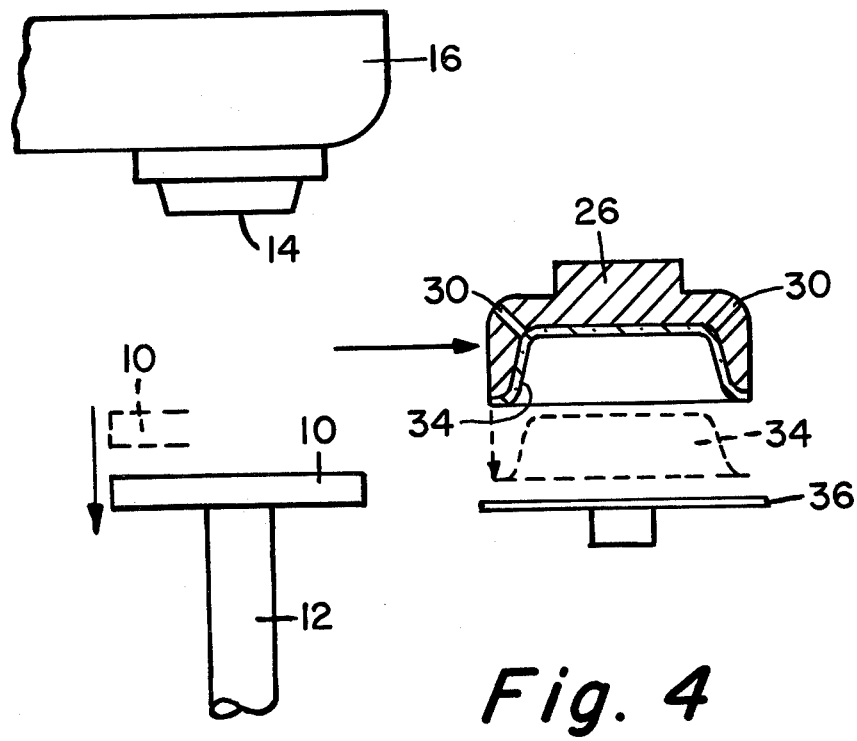

In operation, the charge of molten glass 18 is delivered from orifice 14 to initially form a circular patty 20 on the upper surface of rotating spin plate 10. The stream 18 is sheared by blades 24 and the flow of glass is interrupted at orifice 14. As shown particularly in FIG. 2, the spin plate 10 is indexed downwardly while the molten glass patty 20 is spun into a disc-shaped parison 22 of desired diameter. A suitable mold 26, having a mold cavity 28 of desired configuration and a plurality of passages 30 communicating therewith (see FIG. 3), is indexed horizontally so as to be in axial alignment above the spin plate 10. As shown in FIG. 3, the spin plate 10 is moved upwardly by reciprocating shaft 12 into engagement with axially aligned mold 26.

Both the shaft 12 and the spin plate 10 may have a common central passage 32 for the application of air under pressure which forces the parison 22 upwardly within the cavity 28 of mold 26 for forming an article. Alternatively, or in conjunction with the application of air pressure through central passage 32, a vacuum may be applied through the plurality of passages 30, to vacuum-form the parison 22 into an article 34 having the configuration of cavity 28 of mold 26. After forming, the spin plate 10 is again indexed downwardly to clear the mold 26, and the mold 26 is indexed horizontally with the newly formed glass article 34 therein, and the article is removed such as by applying pressure through passages 30 so as to be deposited upon a suitable takeout platen 36. The movements of the various operating portions are represented by appropriate arrows in FIGS. 1-4.

Figure 5:
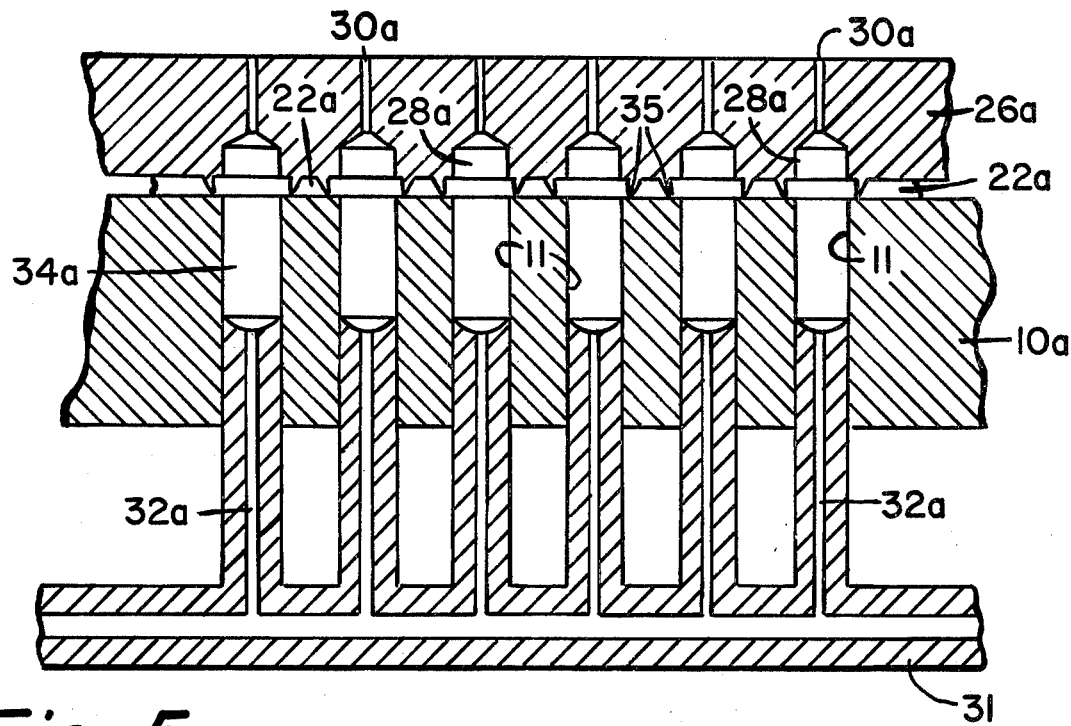
FIG. 5 is a schematic fragmental sectional view in elevation illustrating a further application of the present invention.

Referring now to FIG. 5, a spin plate 10a is shown having a plurality of cavities 11 formed therein and a disc-shaped parison 22a spun out to uniform thickness on its upper surface. A cluster mold 26a, having a plurality of cavities 28a each provided with a passageway 30a, is shown positioned upon spin plate 10a such that the cavities 11 formed in the spin plate 10a and the cavities 28a formed in the cluster mold 26a are axially aligned. The cluster mold 26a is provided with a scoring or cutting edge 35 about each cavity 28a so as to separate the individual articles 34a, formed in the aligned mold cavities, from the remainder of the disc-shaped parison 22a. A header 31 is provided with a plurality of central passages 32a, with each such passage communicating centrally with one of the mold cavities 11 formed in spin plate 10a.

The operation of the forming assembly shown in FIG. 5 is similar to that shown in FIGS. 1-4. That is, spin plate 10a is indexed upwardly below orifice 14 and a stream of molten glass is delivered to the upper surface thereof in an initial circular patty form, and the spin plate 11a is rotated to spin out the patty into a disc-shaped parison 22a of desired thickness. As the parison 22a is being formed, vacuum is applied through header 31 and the individual central passages 32a to draw the glass downwardly within cavities 11. The spin plate 10a is then indexed downwardly and cluster mold 26a is indexed horizontally so as to be positioned axially above spin plate 10a. Spin plate 10a is then indexed upwardly into engagement with the cluster mold 26a as shown in FIG. 5 and excess glass on the top of the spin plate is lightly pressed into mold cavities 28a while an assisting vacuum may be applied through passages 30a to complete the formation of articles 34a into the configuration of the complimentary mold cavities 11 and 28a. As the spin plate 10a engages the cluster mold 26a, the scorings 35, about each mold cavity 28a separates the individual articles 34a from the remainder of the disc-shaped parison 22a. As the spin plate 10a is indexed downwardly, pressure may be applied through header 31 and passages 32a to facilitate the removal of the articles 34a from the cavities 11. The cluster mold 26a is then indexed horizontally, and the articles ejected therefrom such as by the application of pressure through passages 30a.

Figure 6:
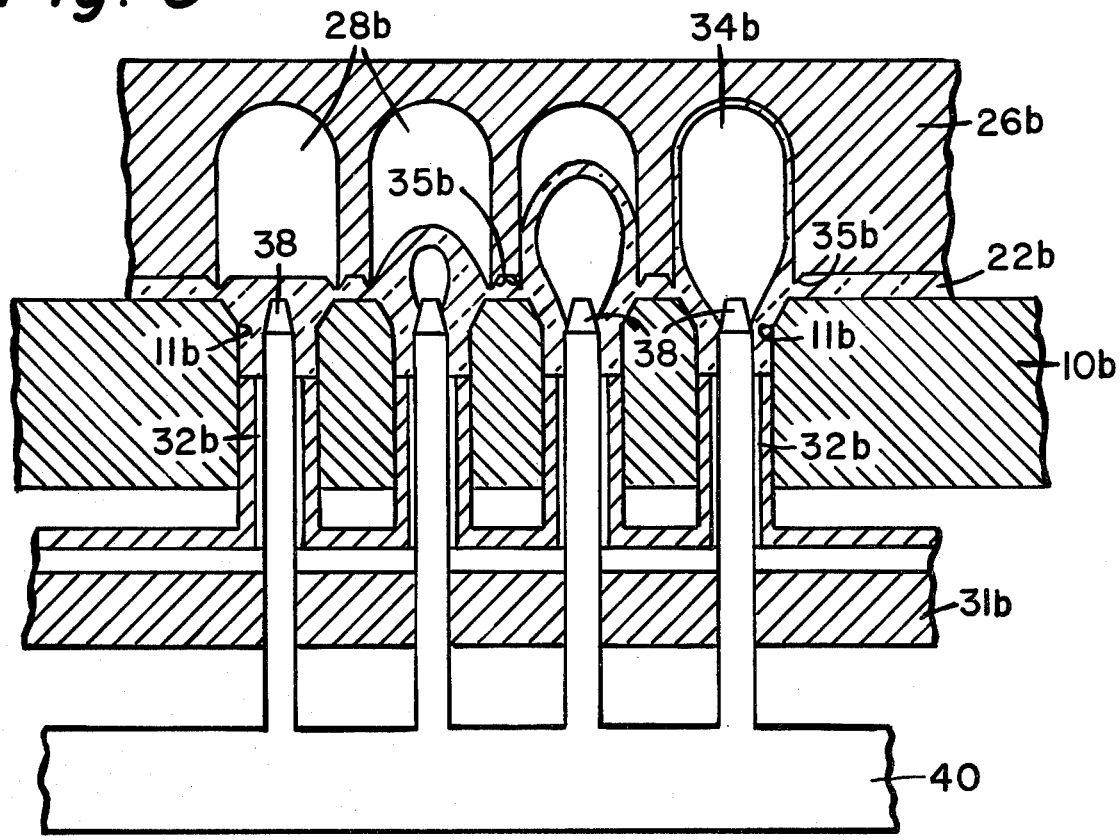
FIG. 6 is a schematic elevational view in section illustrating a still further application of the invention.

Referring now to FIG. 6, a spin plate 10b is shown having a plurality of cavities 11b and a disc-shaped parison 22b spun out on its upper surface. A cluster mold 26b having a plurality of cavities 28b for forming miniature light bulbs 34b is shown positioned in axial alignment with spin plate 10b. The mold has a plurality of scorings 35b for separating the individual articles 34b from the remainder of the spun parison 22b. A header 31b is shown having a plurality of passages 32b, each of which communicates with a cavity 11b of spin plate 10b. Further, a blow tip 38 extends upwardly within each of the passages 32b and is supplied by a blow header 40.

Again, the operation of the embodiment shown in FIG. 6 is similar to that shown in FIGS. 1 through 4 in that the spin plate 10b is initially positioned below orifice 14 and a stream of molten glass is delivered thereto forming a round patty. While the glass is being charged to the spin plate 10b it is spun out into the disc-shaped parison 22b and a vacuum is applied through header 31b and passages 32b to draw the glass downwardly within cavity 11b to form the neck of the bulb 34b. The spin plate 10b is then indexed downwardly and the cluster mold 26b is indexed horizontally to a position above the spin plate 10b such that the cavities 28b and 11b are axially aligned. The spin plate 10b, carrying blow tips 38, is then indexed upwardly into engagement with the cluster mold 26b as shown in FIG. 6, and pressure is supplied to header 40 and blow tips 38 to blow-form bulbs 34b. Although the various miniature light bulbs 34b would all be formed substantially simultaneously in all such cavities, FIG. 6 shows in sequence, from left to right, the bulb 34b being formed as blowing air pressure is applied through the blow tips 38. After forming the miniature light bulbs 34b within the cavities 11b and 28b, the spin plate 10 is moved downwardly, the mold 26b indexed horizontally, and the finished article is removed from the mold cavities.

From the foregoing specific embodiments, it can be seen that the present invention does in fact provide novel method and apparatus for initially forming a substantially uniform radially isothermal disc-shaped parison from relatively low viscosity glasses for accomodating a variety of subsequent forming operations including vacuum forming, blowing, pressing and blanking.

Although the now preferred embodiments have been set forth, it will be apparent to those skilled in the art that various changes and modifications may be made thereto without departing from the spirit and scope thereof as defined in the appended claims.

I claim:

1. A method of forming a disc-shaped parison of molten glass which comprises, positioning a spin plate having a substantially flat upper surface in axial alignment with a discharge orifice, discharging molten glass from said orifice and depositing such glass upon an axial center of the upper surface of said spin plate, and rotating said spin plate about its vertical axial center and uniformly distributing such molten glass radially outwardly across said substantially flat upper surface into a disc-shaped parison of desired thickness centrally of said spin plate.

2. A method of forming a disc-shaped parison of molten glass as defined in claim 1 including the step of initially indexing such spin plate upwardly to receive the discharge of molten glass from said orifice, and then simultaneously spinning and indexing said spin plate downwardly to spin out and distribute such charge into a disc-shaped parison.

3. A method of forming a disc-shaped parison as defined in claim 2 including the steps of providing a mold having a desired shaped cavity above said disc-shaped parison, moving said spin plate upwardly into engagement with said mold, and vacuum forming said disc-shaped parison into the cavity of such mold to form a desired finished article.

4. A method of forming a disc-shaped parison as defined in claim 3 including the steps of providing a mold having a plurality of cavities formed therein above said disc-shaped parison, and blowing said disc-shaped parison into such cavities to form a plurality of articles of desired configuration.

* * * * *